(12) United States Patent
Arnold et al.

(10) Patent No.: US 8,645,917 B2
(45) Date of Patent: Feb. 4, 2014

(54) PROVIDING SUPPORT FOR DEBUGGING HEAP RELATED ERRORS WITH HEAP ASSERTIONS

(75) Inventors: Matthew R. Arnold, Hawthorne, NY (US); Martin Vechev, Hawthorne, NY (US); Eran Yahav, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 12/578,943

(22) Filed: Oct. 14, 2009

(65) Prior Publication Data

US 2011/0087926 A1    Apr. 14, 2011

(51) Int. Cl.
*G06F 9/44*    (2006.01)

(52) U.S. Cl.
USPC ............ 717/118; 717/116; 717/117; 717/119

(58) Field of Classification Search
None
See application file for complete search history.

(56) References Cited

U.S. PATENT DOCUMENTS

| | | | | |
|---|---|---|---|---|
| 5,574,862 | A * | 11/1996 | Marianetti, II | 710/100 |
| 6,671,707 | B1 * | 12/2003 | Hudson et al. | 1/1 |
| 6,826,749 | B2 * | 11/2004 | Patel et al. | 717/148 |
| 7,743,380 | B2 * | 6/2010 | Seidman et al. | 718/105 |
| 2003/0126352 | A1 * | 7/2003 | Barrett | 711/100 |
| 2005/0114413 | A1 * | 5/2005 | Subramoney et al. | 707/206 |
| 2007/0011415 | A1 * | 1/2007 | Kaakani et al. | 711/159 |
| 2007/0022149 | A1 * | 1/2007 | Bacon et al. | 707/206 |
| 2008/0148102 | A1 * | 6/2008 | Tseytin et al. | 714/37 |
| 2009/0172476 | A1 * | 7/2009 | Grey | 714/38 |
| 2009/0271763 | A1 * | 10/2009 | Varma et al. | 717/114 |
| 2010/0223429 | A1 * | 9/2010 | Cher et al. | 711/122 |

OTHER PUBLICATIONS

JProbe by Quest Softwware.*
"GC Assertions: Using the Garbage Collector to Check Heap Properties" by Edward Aftandilian and Samuel Z. Guyer, MSPC'08 Mar. 2, 2008, Seattle, WA, USA.*
"Heap Assertions on demand" by Andreas Podelski, Nov. 26, 2007, Microsoft Research.*
"DeAL: Rich Heap Assertions (Almost) for Free" by Christoph Reichenbach, Neil Immerman, Yannis Smaragdakis, Edward Aftandilian, and Edward Aftandilian, OOPSLA 2010.*
"Predicting Change Propagation in Software Systems" by Ahmed E. Hassan and Richard C. Holt, Proceedings of the 20th IEEE International Conference on Software Maintenance (ICSM'04).*
"Cork: Dynamic Memory Leak Detection for Garbage-Collected Languages" by Maria Jump and Kathryn S. McKinley, POPL'07 Jan. 17-19, 2007, Nice, France.*
"LeakBot: An Automated and Lightweight Tool for Diagnosing Memory Leaks in Large Java Applications" by Nick Mitchell and Gary Sevitsky, ECOOP 2003, LNCS 2743, pp. 351-377, 2003.*
JProbe by Quest Softwware, 2011.*
Arnold et al., QVM: An Efficient Runtime for Detecting Defects in Deployed Systems, OOPSLA'08, Oct. 19-23, 2008, Nashville, Tennessee, USA.

* cited by examiner

*Primary Examiner* — Henry Tsai
*Assistant Examiner* — Jing-Yih Shyu
(74) *Attorney, Agent, or Firm* — Scully, Scott, Murphy & Presser, P.C.; Louis J. Percello, Esq.

(57) ABSTRACT

A programming language support for debugging heap related errors includes one or more queries for determining one or more global properties associated with use of the area by the program. The one or more queries may be executed in parallel or concurrently and dynamically utilize available number of cores.

17 Claims, 9 Drawing Sheets

PROVIDING SUPPORT FOR DEBUGGING HEAP RELATED ERRORS WITH HEAP ASSERTIONS

FIELD OF THE INVENTION

The present disclosure generally relates to computer systems, computer programming and memory allocated in executing programs.

BACKGROUND

Programming languages such as Java™ provide various correctness checking mechanisms such as null pointer dereferencing detection, which alleviates the programmer from having to manually detect and debug these low level programmer errors. However, in recent years, the size and complexity of applications written in these languages has steadily grown, and detecting and debugging errors in these programs has once again become increasingly difficult. There are several basic reasons for this. First, as the language proliferates, various third party frameworks and libraries have been developed. As a result, it has become increasingly easier even for non-expert programmers to build massively complex production quality applications, spanning literally millions of lines of code. Second, many of these applications make heavy use of concurrency and heap. Unrestricted use of heap pointers is particularly difficult to understand and debug. Incidental and accidental pointer aliasing results in unexpected side effects of seemingly unrelated operations, and are a major source of system failures. This problem is only exacerbated in the presence of concurrent operations modifying the heap. Third, while the applications have grown in complexity, the basic correctness checks provided by the programming language have generally remained the same, even though the hardware resources available to the language runtime have also increased (e.g. multiple processors and/or cores).

BRIEF SUMMARY

A system and method for providing programming language support for debugging heap related errors are provided. The system, in one aspect, may include a memory including an area made available to a program, and a processor operable to execute one or more queries for determining one or more global properties associated with use of the area by the program.

A method for providing programming language support for debugging heap related errors, one aspect, may include executing one or more queries for determining one or more global properties associated with use of an area in memory device by a program. In another aspect of the method, at least one of the one or more queries utilizes synchronization primitives to implement parallel execution.

Further features as well as the structure and operation of various embodiments are described in detail below with reference to the accompanying drawings. In the drawings, like reference numbers indicate identical or functionally similar elements.

DETAILED DESCRIPTION

Figure 1:
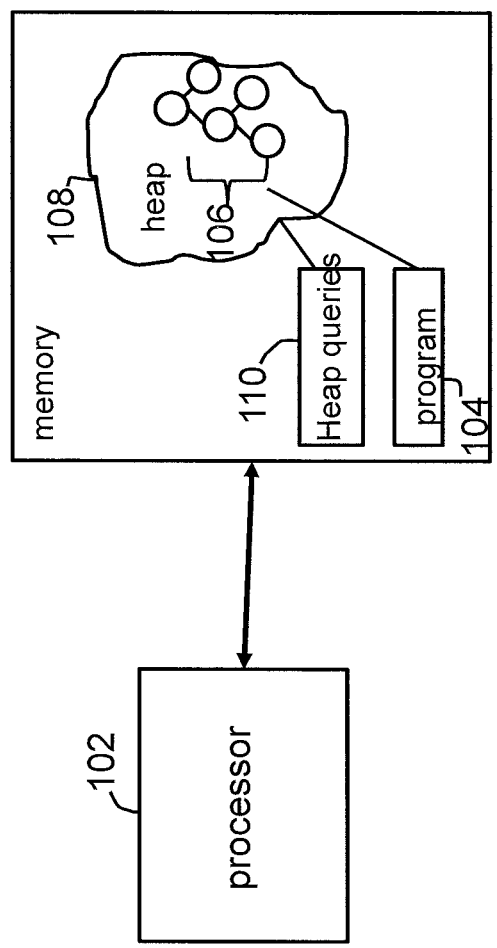
FIG. 1 is an architectural diagram illustrating a running program on a system executing one or more heap queries of the present disclosure in one embodiment.

The present disclosure, in one aspect, provides programming language support for debugging heap related errors. A set of expressive heap queries are identified which can be used to debug a wide range of heap related anomalies. These may include heap properties that involve sharing, ownership, and transitive reachability. As heap queries have very subtle correctness implications, formal semantics are provided for their operation. Based on these semantics, the Java™ language runtime is extended by implementing efficient algorithms that dynamically check these heap queries. The heap query algorithms of the present disclosure, in one aspect, are designed to be evaluated in parallel where applicable, making use of the available resources provided in multi-core machines. Further, the JML compiler is extended to make use of the programming language support, thereby allowing users to write assertions in JML. The heap query algorithms of the present disclosure are also referred to herein as heap probes. For example, the programmer can invoke heap probes from a program in order to inspect the shape of the heap at a program point. The heap probes may use various components of the underlying runtime to obtain an answer.

Heap generally refers to an area in memory in a computer system that is made available to the program, for example, running as one or more processes and/or threads or the like. Users, programmers or the like can insert the assertions in their program that query properties of the heap by using one or more heap query algorithms or heap probes provided in the present disclosure. Briefly, an assertion is a Java™ programming language statement that can be used to test assumptions about a program. An assertion may contain a boolean expression is believed to true when the assertion executes. If it is not true, the system throws an error. The assertion confirms the assumptions about the behavior of the program, for example, if the Boolean expression is indeed true. The return value of a heap probe of the present disclosure may be used in a Java™ assertion. A heap probe used inside an assertion is referred to herein as a heap assertion.

The heap assertions algorithms of the present disclosure enable the dynamic checking of various global heap properties such as object-sharing, ownership, thread-ownership and reachability, for instance, independently of sampling, with parallel heap scan, and/or concurrent snapshot technology. These properties are useful for both debugging and program understanding.

In the present disclosure, new parallel algorithms are provided also, for example, for efficient evaluation of heap queries, and implementation of the parallel algorithms, for example, in a production virtual machine. Evaluation of heap queries involves computing transitive closure of the heap graph. One embodiment of the present disclosure evaluates queries directly on the heap graph, using a heap traversal.

The heap probes of the present disclosure are portable. For instance, the algorithms in one embodiment are not specific to a particular runtime. The algorithms also are designed to use the common components present in most virtual machines, such as heap traversal components, synchronization primitives and auxiliary object data, so that these algorithms may be implemented in different virtual machines. Moreover, the algorithms are designed such that the work done during heap query evaluation can be reused by the garbage collector of a machine platform.

The algorithms of the present disclosure are also designed to leverage all of the available cores in the system, for example, to speed up the evaluation of heap queries, thus providing parallel heap query processing capabilities. The algorithms operate efficiently in both sequential and parallel settings. For parallel operations, the present disclosure provides synchronization mechanism to correctly execute these algorithms in parallel.

FIG. 1 is an architectural diagram illustrating a running program on a system executing one or more heap queries of the present disclosure in one embodiment. A processing unit 102, for instance, executes a program 104 which allocates various objects 106 in memory 108. These objects 106 may include data structure and other elements that the program allocates. A processing unit 102 may be a single or multi-core processor, or a central processing unit (CPU) or multi-core CPU, or others. Heap queries of the present disclosure 110 may be executed to determine the properties of the heap-allocated objects 106.

Algorithms

This section describes the basic components used for heap traversal (tracing and marking), and then explains the algorithms in a sequential setting. The algorithms in a parallel setting are explained later.

The following shows basic components of a heap traversal algorithm.

```
trace( )
    while (pending ≠ φ)
        remove s from pending
        for each o ∈ { v | (s, v) ∈ E }
            trace-step(s, o)
            mark-object(o)
```

```
tag-object(o)
    if (tag-step(o) = false)
        return false
    atomic
        if (o ∉ Marked)
            Marked ← Marked ∪ { o };
            return true
        else return false
mark-object(o)
    if (tag-object(o) = true)
        push-object(o)
push-object(o)
    pending ← pending ∪ { o }
mark-thread($t_a$)
    for each o ∈ roots($t_a$.stack)
        mark-object(o)
    mark-object($t_a$, obj)
mark-roots(T)
    for each $t_a$ ∈ T
        mark-thread($t_a$)
    mark-object(static)
```

In the above pseudo-code, a set represents the set of objects not yet processed; s, o, obj, and v denote objects. These components are standard components used for a tracing garbage collector. The set $T_a$ denotes the set of (running) application threads in the system at the time a probe is invoked. For an application thread $t_a$, we use $t_a$.stack and $t_a$.obj to denote the thread's stack and the thread's object. In pseudo code we assume that all sets are initially empty.

The procedure mark-thread( ) marks the objects directly pointed to by an application (running) thread stack and thread object, but does not perform further traversal from that set. The procedure trace( ) performs heap traversal to compute the set of objects reachable from the set "pending". The marking proceeds as usual in garbage collection, but we have added callback procedures trace-step and tag-step, which are called on each newly encountered reference. Different implementations of the various heap probes customize these routines in specific ways. The default return value of "tag-step" is true. The default implementation of "trace-step" is empty. The callback procedure trace-step may be invoked every time an object is encountered during the tracing phase, but it cannot change the flow of the tracing phase. The callback procedure tag-object may be called when an object is encountered and can change the flow of the tracing phase. The tag-object can also be called externally to mark an object but without placing the object in the pending set for further tracing.

Table 1 illustrates heap probes provided in the present disclosure and their corresponding probe name in one embodiment.

TABLE 1

| Query | Description | Probe Name |
| --- | --- | --- |
| pred(o).size( ) > 0 | Is o pointed to by a heap object? | isHeap(Object o) |
| pred(o).size( ) > 1 | Is o pointed to by two or more heap objects? | isShared(Object o) |
| reach(src).has(dst) | Is dst reachable from src? | isReachable(Object src, Object dst) |
| !(exists Object v; reach(o1).has(v) ; reach(o2).has(v)) | Is there an object reachable from both o1 and o2? | isDisjoint(Object o1, Object o2) |
| !(exists Object v ; reach(o).has(v) ; !dom(o,v)) | Does o dominate all objects reachable from it? | isUniqueOwner(Object o) |
| !reach(o1,cut).has(o2) | Does every path from o1 to o2 go through an object in cut | reachThrough(Object o1, o2, Object[ ] cut) |
| dom(Thread.currentThread( ), o) | Does the current thread dominate o? | isObjectOwned(Object o1, Object o2) |

TABLE 1-continued

| Query | Description | Probe Name |
|---|---|---|
| dom(stack(Thread.currentThread( )), o) | Does the current thread's stack dominate o? | isThreadStackOwned(Object o) |
| dom(roots(Thread.currentThread( )), o) | Does the current thread dominate o? | isThreadOwned(Object o) |
| { Thread t \| running( ).has(t) && (reach(t,avoid).has(o) \|\| reach(stack(t),avoid).has(o) ) } | Threads from which object o is reachable not through avoid | getThreadReach(Object o, Object [ ] avoid) |

"isHeap" probe checks that the only references to an object are stack references, and that the object is not pointed to from the heap. This probe can check that an object does not escape from a procedure to be stored in the heap. This may be useful in a concurrent setting where exposing a heap-reference to an object might lead to an undesirable concurrent modification. "isUniqueOwner" probe checks whether any object reachable from the transitive closure set of object o is reachable from an object outside of this set.

The following heap probing algorithm are explained below in detail: "isReachable", "isThreadOwned", "IsShared", "IsObjectOwned", "reachThrough", "getThreadReach", and "IsDisjoint".

An example pseudo code for "isReachable" is as follows:

```
isReachable(source; target)
    mark-object(source)
    trace( )
    if barrier-and-release-master( )
        if (target ∈ Marked) result ← true
        else result ← false
        release-blocked-evaluators( )
``` isReachable(source, target) algorithm determines whether "target" is reachable from "source". isReachable algorithm operates by marking the set of objects reachable from source, and resembles tracing garbage collection. The probe starts by marking the source object, and then traces from it. When the tracing is completed, the object pointed to by target is guaranteed to be marked if and only if it is reachable from the source. The return value result is set accordingly. trace-step( ) is not needed in this probe and is left empty.

Figure 2:
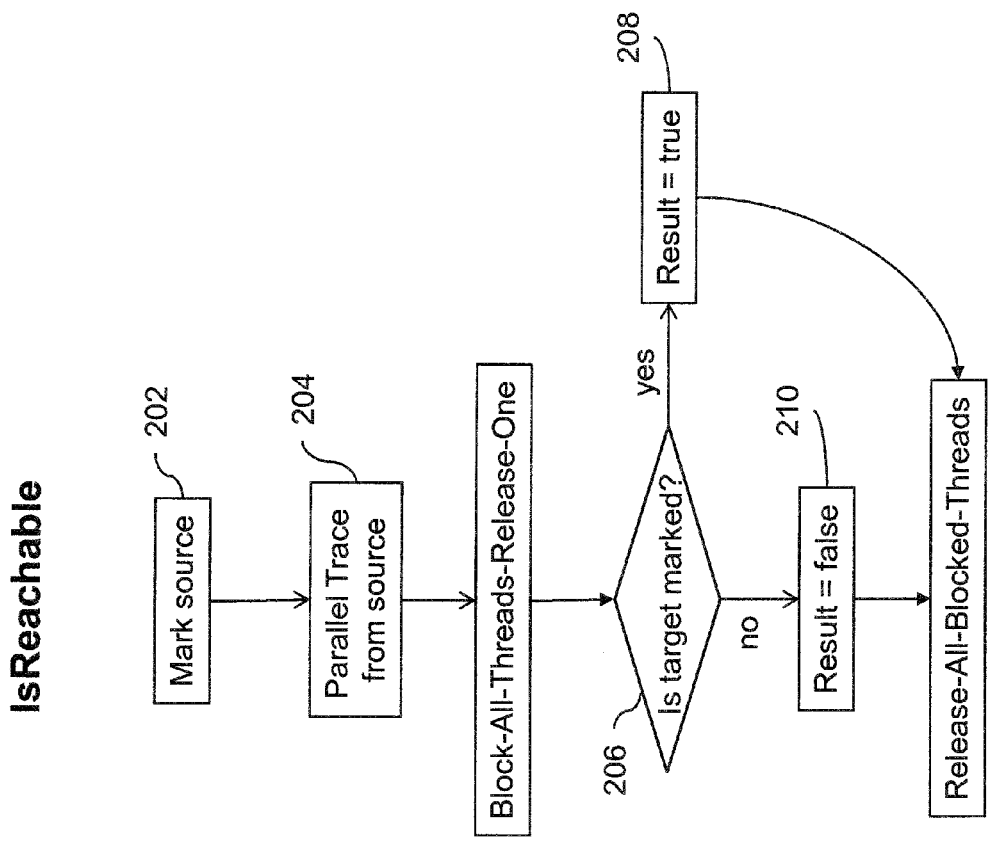
FIG. 2 is a flow diagram illustrating the "isReachable" heap query algorithm in one embodiment.

FIG. 2 is a flow diagram illustrating the "isReachable" algorithm in one embodiment. At 202, the source object is marked. At 204, the source object is traced by following the edge or edges from the source object to the next node or nodes. The logic of FIG. 2 then blocks all threads and releases one at 'Block-All-Threads-Release-One' component. The next nodes are marked and traversed in the same manner, until there are no edges, i.e., the tracing is complete.

At 206, it is checked to determine whether the target object is marked. At 208, a value of true is returned if the target object is marked at the completion of tracing, otherwise at 210, a value of false is returned. The logic of FIG. 2 then releases all blocked threads at 'Release-All-Blocked-Threads' component.

An example pseudo code for "isThreadOwned" is as follows:

```
isThreadOwned(t_a, o)
    mark-roots(T_a \ { t_a })
    trace( )
```

```
    if barrier-and-release-master( )
        if (o ∈ Marked) result ← false
        else result ← true
        release-blocked-evaluators( )
``` isThreadOwned($t_a$, o) determines whether the current thread dominates object "o". That is, this probe checks if object o is reachable only from the calling application thread $t_a$. To compute this, we trace from all application threads except from $t_a$. If object o is marked, then it is not owned by $t_a$ and we return false, otherwise we return true. This probe assumes that $t_a$ is the application thread that invokes the probe, hence object o is always reachable from $t_a$, and we do not need to explicitly check that.

Figure 3:
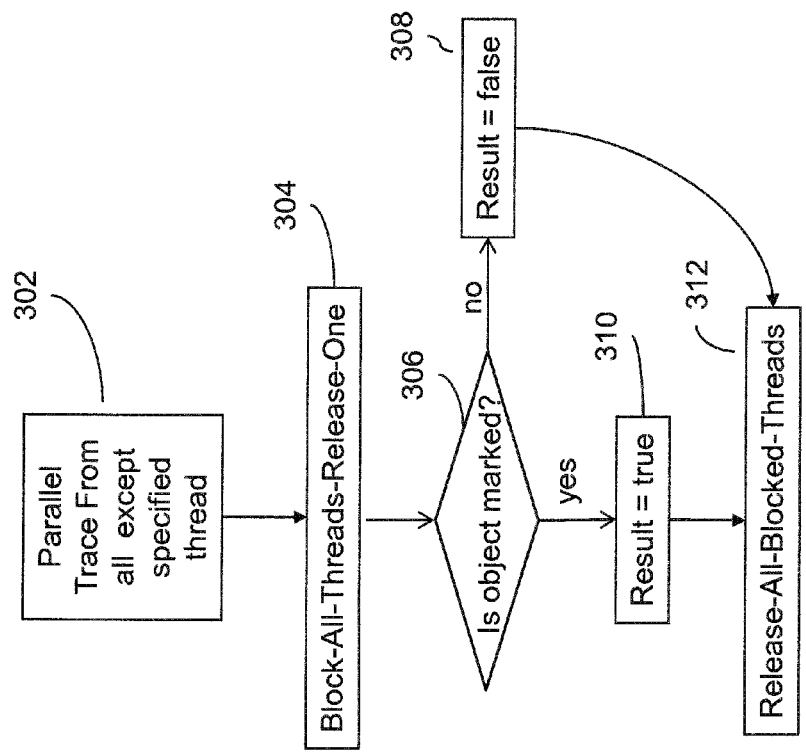
FIG. 3 is a flow diagram illustrating the "isThreadOwned" heap query algorithm in one embodiment.

FIG. 3 is a flow diagram illustrating the "isThreadOwned" heap query algorithm in one embodiment. At 302, trace all application threads, except the specified thread, for example, the calling application thread. Step 302 may be performed in parallel. Step 304 blocks all threads and releases one. At 306, check whether the object is marked. If the object is marked, return false at 308. At 310, return true otherwise. At 312, all blocked threads are released.

The operation of this probe is similar to tracing collectors, with a difference being that there is specific order on the way threads are processed. If we would like to perform garbage collection during this probe, after the probe completes, we can proceed to mark and trace from only the roots of the current application thread $t_a$. That is, collection can reuse the rest of the work that was done for the probe.

An example pseudo code for "isObjectOwned" is as follows:

```
isObjectOwned(source, target)
    tag-object(source)
    result ← false
    phase ← skip
    barrier( )
    mark-roots(T_a)
    barrier( )
    phase ← none
    trace( )
    barrier( )
    if (target ∉ Marked)
        barrier( )
        push-object(source)
        trace( )
        if barrier-and-release-master( )
            if (target ∈ Marked) result ← true
            release-blocked-evaluators( )
tag-step(t)
    if (phase = skip ∧ t = target)
        return false
``` isObjectOwned(source, target) probe only returns true when all paths to target go through source and there is at least one such path. The algorithm uses a special sequence for processing nodes, and only uses the single set Marked. The basic idea is to mark source without tracing from it, and then trace through all other roots. Since source is marked during tracing, it will not be traced through and all objects that are reachable only through source will remain unmarked.

First, the algorithm uses tag-object( ) to mark the source object without tracing from it. Then, the algorithm switches to skip phase and marks all objects pointed to from the roots (except target) without tracing from them yet. The skip phase may be used to denote a phase where we will not mark the target object even if we encounter it during the marking of the roots. That is, even if a root points to the target object, if we are in the skip phase, we will not mark the target object.

The purpose of this phase is to avoid marking target if it is pointed directly from the roots as we want to reason only about heap paths. Then, the phase is switched to none or normal to perform tracing as usual. The switching of the phase tells us that now we can proceed with usual tracing, that is, every time we encounter an object, we mark it and its children. The phase=none denotes that there are no special exceptions here. This phase may be referred to herein also as "Normal".

During tracing, if the source object is encountered, tracing will not continue to trace from it because it is already in the Marked set. Upon completion of the tracing phase, we check whether target is marked. If it is marked, then the probe returns false. Otherwise we proceed to check if target is reachable from source and if it is, the result is set to true.

The source object is managed carefully, to allow garbage collection to be performed during this probe. The source object is marked during the probe but it is not placed in the pending set. If we continue with a garbage collection after this probe, we need to make sure that source is added to pending.

One of the challenges of implementing probes of this type in a language runtime is dealing with stack pointers. In particular, objects source and target are always reachable from the stack of the application thread that invoked the heap probe. An implementation may focus on domination through heap paths, and ignore all stack pointers to target. Alternative implementations could identify which stack pointers to consider and which stack pointers to ignore.

Figure 5:
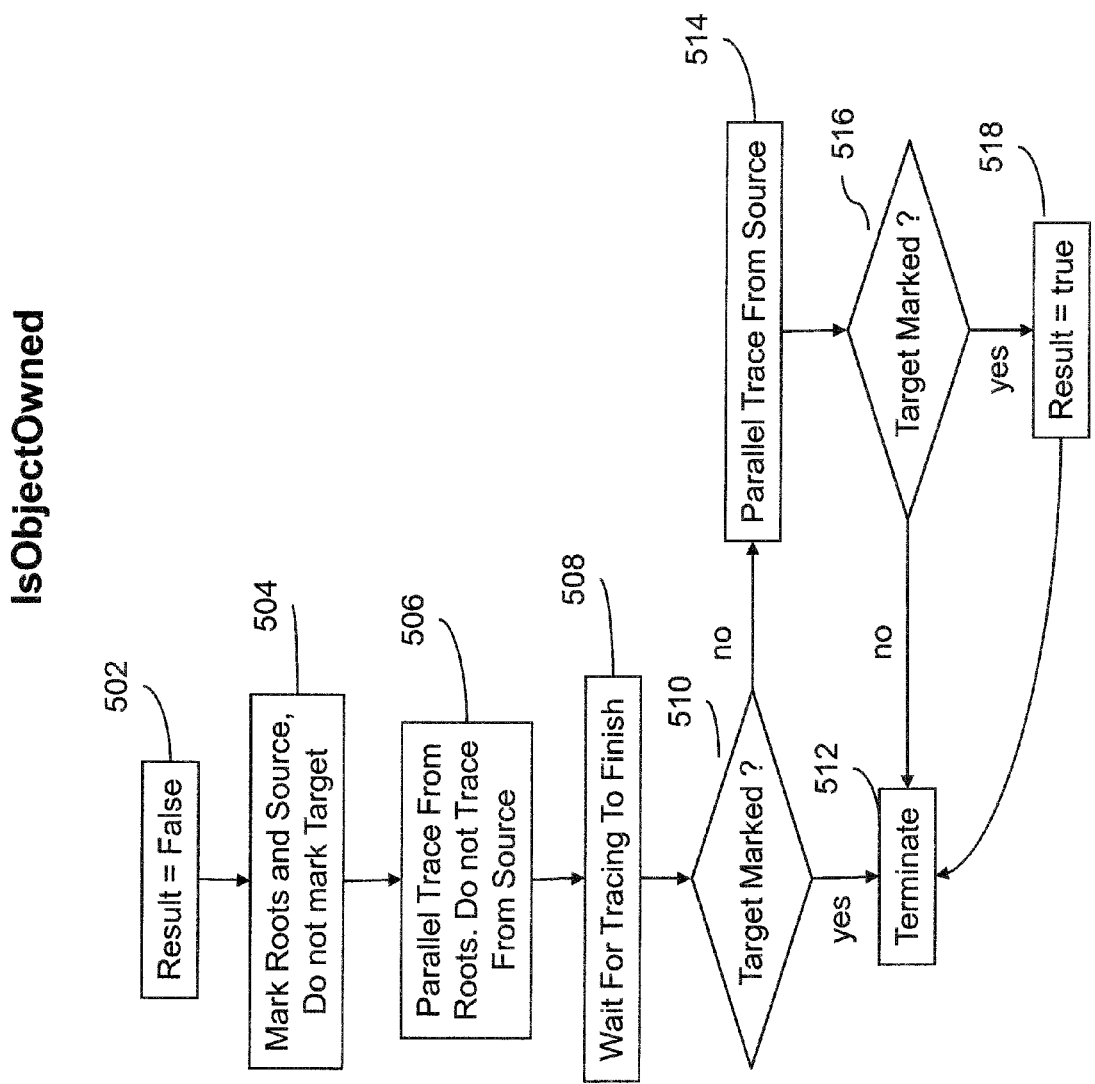
FIG. 5 is a flow diagram illustrating the "isObjectOwned" heap query algorithm in one embodiment.

FIG. 5 is a flow diagram illustrating the "isObjectOwned" heap query algorithm in one embodiment. At 502, set result to false. At 504, roots and source are marked. Target is not marked. At 506, tracing from root is performed. This may be done in parallel. Tracing is not performed from the source. At 508, wait for tracing to complete. At 510, if the target is marked, the algorithm terminates at 512. If at 510, the target is determined to be not marked, tracing is performed from the source at 514. Tracing from the source may be performed in parallel. At 516, if the target is marked, then result is set to true at 518. Otherwise, the algorithm terminates at 512.

An example pseudo code for "getThreadReach" is as follows:

```
thread[ ] getThreadReach(o, avoid[ ])
    foreach t_a ∈ T_a
        foreach a ∈ avoid[ ] tag-object(a)
        barrier( )
        mark-thread(t_a)
        trace( )
        if barrier-and-release-master( )
            if (o ∈ Marked)
                result ← result ∪ t_a.obj
            Marked ← φ
            release-blocked-evaluators( )
```

This probe returns all application thread objects which can reach object o without going through any object in the avoid set. We consider each application thread $t_a$ in turn, to see if o can be reached from that thread. As in isThreadOwned, we first tag all objects in avoid set. Then we compute the transitive closure from that thread. Computing the transitive closure includes marking all the reachable objects from the thread t_a. We mark the t_a thread and then keep computing every object that is reachable from it.

If after that, o is marked, then the application thread is inserted into the result set, otherwise, we do not insert it. Note that, after processing each application thread, the Marked set is initialized to null.

This probe tracks reachability from both thread stacks and thread objects. We can specialize it further to track reachability only from thread stacks or only from thread objects.

Figure 7:
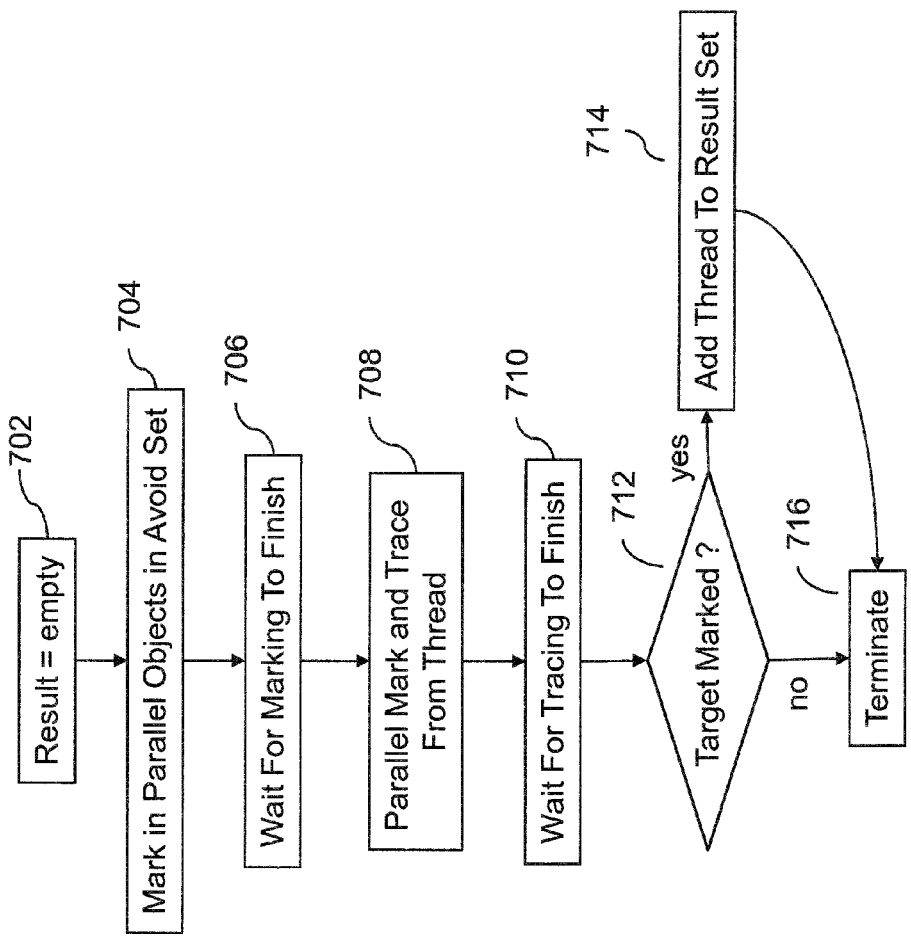
FIG. 7 is a flow diagram illustrating the "getThreadReach" heap query algorithm in one embodiment.

FIG. 7 is a flow diagram illustrating the "getThreadReach" heap query algorithm in one embodiment. At 702, result is set to empty. At 704, the objects in an avoid set are marked. This step may be performed in parallel. Step 706 waits for the marking to finish. At 708, marking and tracing are performed. The marking and tracing at 708 may performed in parallel. Step 710 waits for tracing to finish. At 712, if it is determined that the target is marked, the thread is added to the result set at 714. The algorithm terminates at 716.

An example pseudo code for "reachThrough" is as follows:

```
reachThrough(o1, cut[ ], o2)
    result ← true
    foreach c ∈ cut[ ] tag-object(c)
    barrier( )
    mark-object(o1)
    trace( )
    barrier( )
    if (o2 ∈ Marked) result ← false
```

This probe checks that all paths from object o1 to object o2 go through at least one object in the set cut. The algorithm may use similar implementation as isObjectOwned. First, it marks all the objects in the set cut but does not trace from them. Then it marks and traces from object o1. If during this process, we encounter an object in the cut, we will not trace through the object as it was already marked. At the end of the tracing from o1, if we see that object o2 is marked, then there must have been a path from o1 to o2 not going through any object in the set cut. In that case, the probe returns false. Otherwise, the probe returns true.

Figure 6:
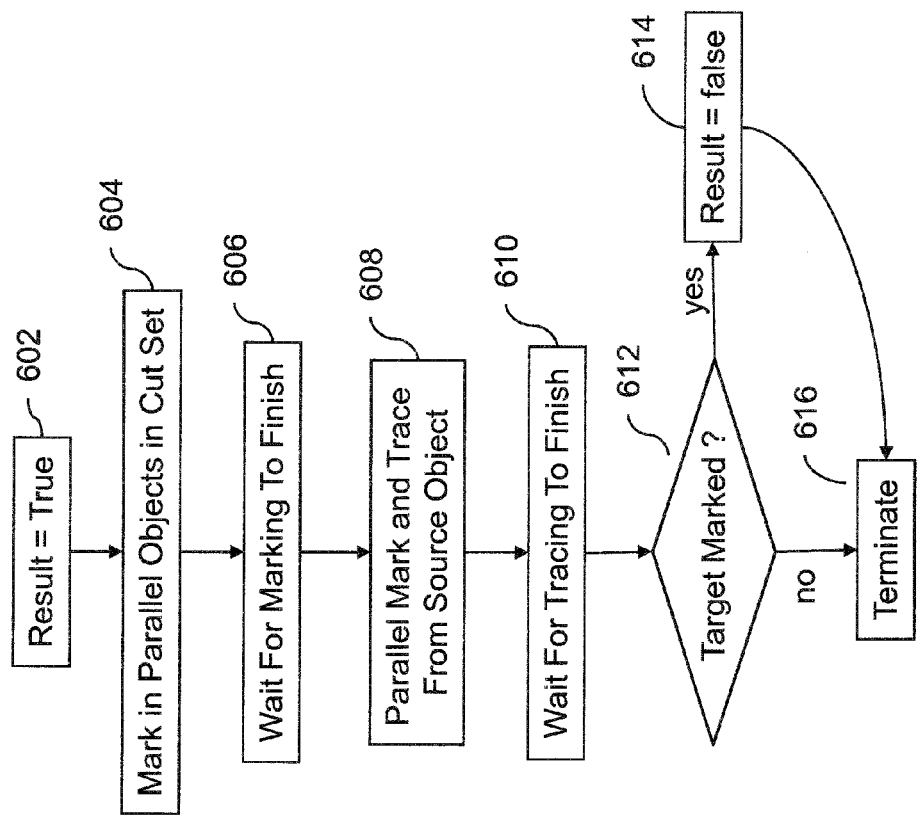
FIG. 6 a flow diagram illustrating the "reachThrough" heap query algorithm in one embodiment.

FIG. 6 a flow diagram illustrating the "reachThrough" heap query algorithm in one embodiment. At 602, result is set to true. At 604, objects in the cut set are marked. Step 604 may be performed in parallel. Step 606 waits for marking to finish. At 608, marking and tracing from the source object are performed. This step may be performed in parallel. Step 610 waits for tracing to finish. At 612, if the target is marked, the result is set to false at 614. At 616, the algorithm terminates.

An example pseudo code for "isDisjoint" is as follows:

```
isDisjoint(o1; o2)
    result ← true
    phase ← dual
    mark-object(o1)
    trace( )
    if (o2 ∈ Marked) result ← false
    barrier( )
    phase ← check
```

```
            temp ← result
            barrier( )
            if (temp = true)
                mark-object(o2)
                trace( )
                barrier( )
            phase ← none
      trace-step(s, t)
            if (phase = dual) Owned ← Owned ∪ {t}
            else if (phase = check ^ t ∈ Owned)
                result ← false
``` isDisjoint(o1,o2) probe queries whether there is an object reachable from both o1 and o2. This property is computed with more than a single reachability computation. In particular, the computation of this probe uses two sets of objects (as opposed to the single Marked set when computing reachability). The basic idea is to compute the set of objects reachable from o1 and intersect it with the set of objects reachable from o2. However, we do this more efficiently, and in a way that guarantees that work performed by probe computation can be re-used for garbage collection. Initially, the result is true and the phase is dual. During the dual phase (tracing from o1), traced objects are added to the Owned set and to the Marked set. The set Owned is not updated in later phases, and identifies the objects reachable from o1. When the tracing finishes, we check whether o2 is marked and if it is, result is set to false. Otherwise, we switch the phase to check. During the check phase (tracing from o2) we check if an object in the Owned set is encountered during tracing, and set the result to false if it does. Upon completion, all objects reachable from o1 and o2 are guaranteed to be in the Marked set. Finally, we switch the phase to none. This means that if we would like to proceed with garbage collection, we can do so in the usual manner.

Figure 8:
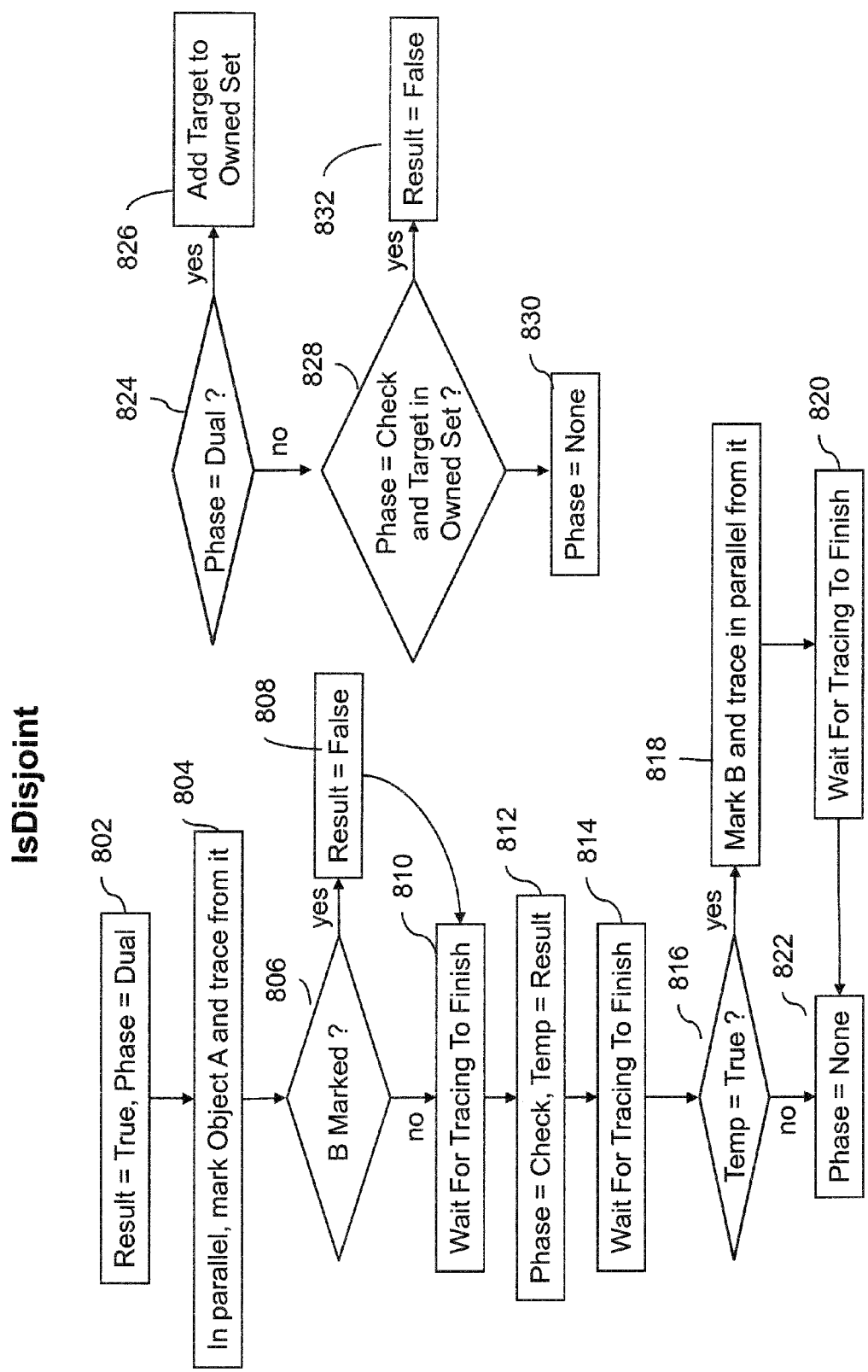
FIG. 8 is a flow diagram illustrating the "isDisjoint" heap query algorithm in one embodiment.

FIG. 8 is a flow diagram illustrating the "isDisjoint" heap query algorithm in one embodiment. At 802, result is set to true and phase is set to dual. At 804, object A is marked and tracing starts from this object. Step 804 may be performed in parallel. At 806, if it is determined that object B is marked, result is set to false at 808. Step 810 waits for tracing to finish. At 812, phase is set to check and temp is set to result. Step 814 waits for tracing to finish. At 816, if temp is true, object B is marked and traced. This step may be performed in parallel at 818. Step 820 waits for tracing to finish. At 822, phase is set to none or normal. At 824, if phase is set to dual, the target object is added to the owned set at 826. Otherwise at 828, if the target object is in owned set, result is set to false at 832. At 830, phase is set to none or normal.

A common way to speed up a computation on a multicore machine is to have multiple threads working on disjoint, non-interfering parts of the same problem. Examples include implementation of matrix multiplications, unionfind, mergesort, and tree traversals. The correctness of the computation often relies on the data processed by one thread being disjoint from data processed by all others. This property might not be obvious when the data is stored in multiple collections. The programmer can use the heap query isDisjoint to check this assumption.

As another example of a use scenario of heap queries of the present disclosure, consider the following example system for storing and retrieving objects in a relational database. In this system, the Database class provides an interface to clients for performing various operations on the database. Each operation acquires a connection, performs its task on the database, and releases the connection. The ConnectionManager class maintains a map of all available connections. Each Connection object is confined in a ConnectionSource object. The invariant of the system library is that every Connection is used by at most one database operation at a time. To check that the program code does not violate this invariant condition, the programmer may want to check that a connection object is reachable from at most one thread using one or more heap queries of the present disclosure.

Synchronization

The parallel algorithms operate by stopping the application, evaluating the heap query in parallel on the program heap, and then resuming the application.

To evaluate the heap query in parallel, we use a set of evaluator threads, usually one for each available core. Interaction of the evaluator threads is designed with careful attention to synchronization, in particular, for algorithms that perform a multi-phase traversal. We use the following synchronization primitives:

Barrier: A barrier is provided by the function barrier( ). When an evaluator thread calls barrier( ), it blocks and waits for all other evaluator threads to arrive at the barrier. When they have all called barrier( ), all of the evaluator threads are released to continue.

Barrier with Master thread: One of the evaluator threads is designated as the master thread. When a thread calls the function barrier-and-release-master( ), it blocks, just like in the case of barrier( ). When all of the evaluator threads have called the function, only the master thread is released and allowed to continue, while the other threads remain blocked. These threads remain blocked until the master releases them by a call to the function release-blocked-evaluators( ). The procedure barrier-and-release-master( ) returns true for the master thread and false for all others threads.

The challenge is to place enough synchronization barriers to guarantee correct interaction of the evaluator threads without penalizing performance. The following describes how the synchronization may be used in the algorithms described above. The variables "result", "phase", "Owned", "Marked", "Ta" are shared, all other variables are local to the evaluator thread.

In "isReachable" algorithm, every evaluator thread marks the source object, and then traces from it. All evaluator threads eventually block at barrier-and-release-master ( ). When this happens, the object pointed to by target is guaranteed to be marked if and only if it is reachable from source. At this point, the master thread sets the return value based on whether the target object is marked. This need only be done by one thread, hence the use of the master. Then the master releases the other evaluator threads.

The algorithms for "isThreadOwned", "isShared", and "getThreadReach" use barriers in a similar way.

In "isDisjoint" algorithm, every evaluator thread sets the shared result variable to true and sets the shared phase variable phase to dual at the beginning. After tracing, all evaluator threads synchronize via the barrier to ensure completion of the dual phase, before switching to the check phase. After synchronously switching to "check" phase, every evaluator thread reads the value of "result" into its local variable "temp". If after the barrier the result is still true, the evaluator starts tracing from o2. Upon completion, the evaluator threads synchronize and switch phase to none.

Similarly, barriers are used for switching phases in "isObjectOwned" algorithm.

The following illustrates an example "isShared" algorithm:

```
isShared(o)
    sources ← φ
    mark-roots(T_a)
    trace( )
    lock(allsources)
    allsources ← allsources ∪ sources
    unlock(allsources)
    if barrier-and-release-master( )
        if |allsources| > 1 result ← true
        else result ← false
        release-blocked-evaluators( )
trace-step(s, t)
    if (o = t) sources ← sources ∪ {s}
```

In "isShared" algorithm, every evaluator thread uses a private set "sources" to record the objects pointing to "o" that it encountered during its traversal. By using private sets, we avoid the need for synchronization between evaluator threads during the tracing phase (e.g., this is an alternative to incrementing a shared counter). When the tracing phase completes, evaluator threads combine their local sets into a global view by updating a global set "allsources" under a lock. The local sets is combined as it is possible that "o" is shared but each parallel evaluator reached it only once during its traversal. Finally, the threads synchronize, for example, the master thread computes the result (if we have more than one object in "allsource", we return "true", otherwise false) and releases the rest of the evaluator threads.

Figure 4:
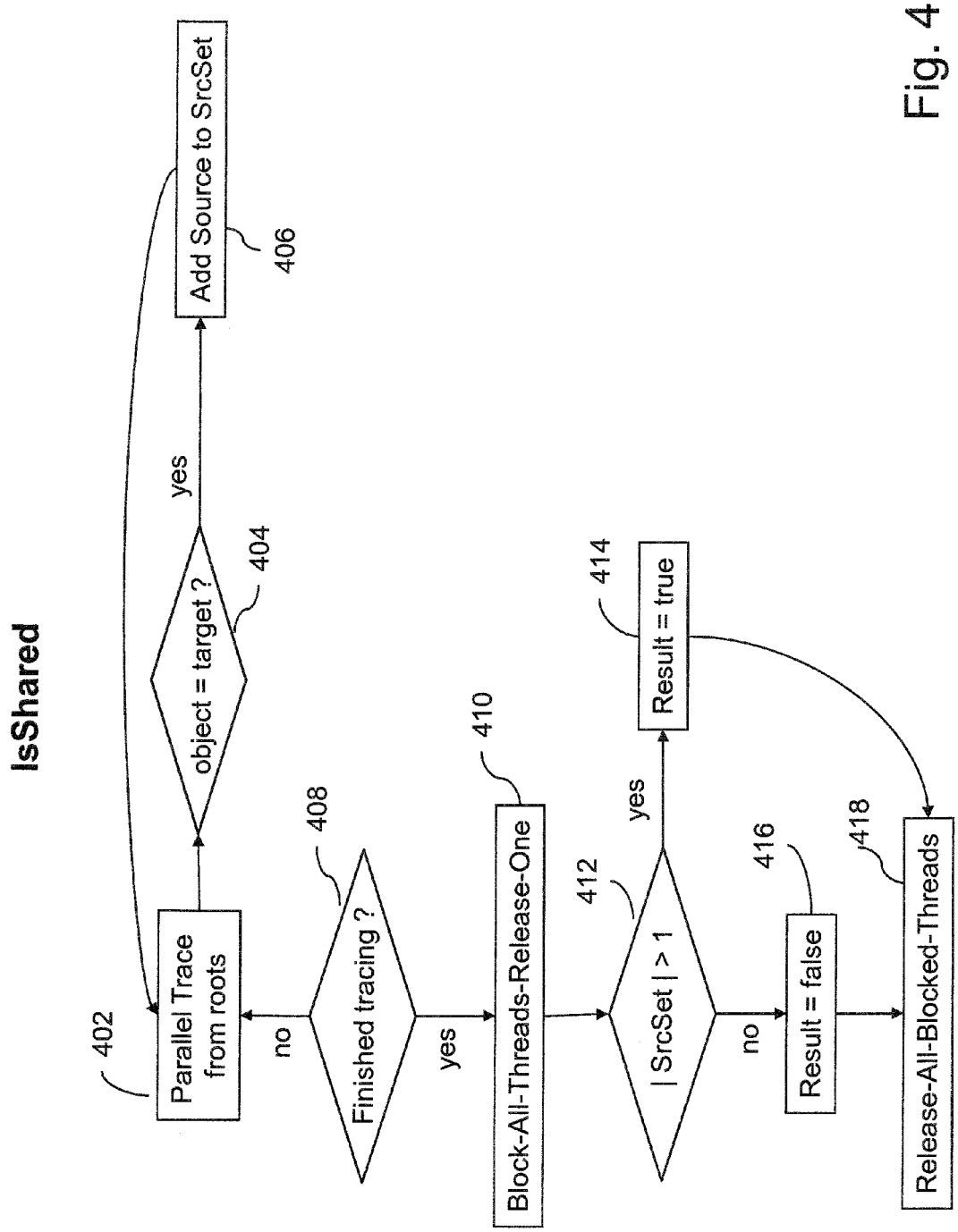
FIG. 4 is a flow diagram illustrating the "isShared" heap query algorithm in one embodiment.

FIG. 4 is a flow diagram illustrating the "isShared" heap query algorithm in one embodiment. At 402, tracing is performed from the roots. This step may be performed in parallel. At 404, if the object is the target object, the source object added to the SrcSet at 406. At 408, if tracing is finished, at 410, all threads are blocked and one is released. At 412, if the size of the SrcSet is greater than one, than at 414, result is set to true. Otherwise, at 416, result is set to false. At 418, all blocked threads are released.

For clarity of presentation explanation of some optimizations are excluded from the description. For example, in "isDisjoint", when result is set to false by an evaluator thread, the probe can immediately return true, if we do not require garbage collection to start after probe computation. Another example is corner cases such as in getThreadReach, when "o" is in avoid, we can immediately return false, or in "reachThrough", when "cut" is empty.

The above-described algorithms perform queries on a graph, and are used to perform queries on the heap that may be represented by a graph defining a state of a running program. For instance, concrete program states can be represented as graphs. In Java operational semantics, for example, a program state may include a global program counter, a current thread register, a heap, a thread table, an internal class table that records the runtime representations of the loaded classes, an environment that represents the source from which classes are to be loaded, and error flags. The heap queries may use information about the heap, the thread table, and the internal class table. The heap is a map from addresses to objects. The thread table contains, for each running thread, the program counter and the method invocation stack (a.k.a. "call stack"). The call stack is a list of frames; a frame includes the method being invoked, its operands, local variables, and an object on which the invocation is synchronized. The internal class table is a map from class names to direct superclass, interfaces, fields, methods, access flags, and byte code.

For a state s, a directed graph g(s) may be defined whose nodes include the heap-allocated objects labeled by types, and whose edges represent references between objects. The heap queries may utilize graph- and set theoretic operations on g(s). Every allocated object in the heap of s may be represented by a node in the graph.

Integration with Virtual Machine

The parallel algorithms of the present disclosure may utilize the machinery already present in the virtual machine (e.g., Java™ Virtual Machine), and used by the existing parallel garbage collector in a specific manner. The infrastructure of the existing virtual machine may be utilized, for example, by putting the components together to yield the more general computations used by the heap queries of the present disclosure. Production grade virtual machines are complex pieces of code, and correctly integrating the heap query algorithms is challenging. These challenges are like to arise when implementing the algorithms in different virtual machines.

Reuse of Infrastructure

A virtual machine may provide the basic components for heap traversal and synchronization primitives such as barriers. When the virtual machine starts, evaluator threads are created, one for each core. These evaluator threads are initially blocked. The runtime uses these threads for parallel garbage collection. We use these threads for evaluation of our heap queries.

The heap queries of the present disclosure also utilize object sets. The existing set operations facility in the virtual machine is typically used by the garbage collector to put objects in a marked set (implemented via marked bits that can be efficiently set and cleared). For our algorithms, when necessary, we use this capability to create and manipulate other sets. For example, in "isDisjoint" algorithm, we use the set Owned in addition to Marked. "getThreadReach" algorithm assigns "Marked" set to be empty. Practically, this is possible in our virtual machine because the marked bits for each object can reside in a continuous memory region outside of the object space, allowing for re-initializing of that space.

Interaction with Garbage Collection

The heap queries of the present disclosure may also share heap traversal components. Some of the components used by our heap probes are also used by garbage collection. Care should be taken to make sure that changes to these components do not affect the operation of the normal collector.

For example, heap traversal routines now contain calls to "trace-step" or "tag-step", which should not be invoked during normal garbage collection cycles.

To distinguish an evaluator thread performing heap query evaluation from a thread performing garbage collection, we re-use some of the free space in each evaluator-thread structure to denote its kind. The kind of a thread is set when the operation starts (i.e., query evaluation or garbage collection) and is used only when necessary.

In another embodiment of the implementation for sharing heap traversal component, arguments may have been added to existing functions. In general, some probes make use of the free space available in the evaluator-thread structure. For example, rather than storing information in a shared location that requires synchronization on each access, some of the algorithms store the information locally in the evaluator-thread structure, and synchronize and merge it into a shared result only at the end of query computation (e.g., isShared).

Performing Garbage Collection During Heap Query Evaluation

Our parallel algorithms are designed and integrated into the virtual machine such that the work done during query evaluation can be re-used by the garbage collector. Hence, in addition to answering the required heap query, we have the option to perform garbage collection right after the probe finishes, leveraging the tracing work done by the probe. That is, the collector can piggyback on our heap query evaluation.

Some of our algorithms require marking an object without tracing from it (e.g., isObjectOwned). To enable reuse of the work performed by heap evaluation for garbage collection, we keep track of such objects. If garbage collection is performed when the probe computation finishes, these tracked objects are pushed to pending for garbage collection. Failure to do so might lead to sweeping of live objects (the ones reachable from the tracked objects).

If the probe is not required to perform garbage collection and returns immediately, we need to make sure that all intermediate state used by the probe that may be used by the normal collection cycle is reset (e.g., clearing the Marked and the pending sets, setting phase to none).

Our parallel algorithms for heap probe evaluation can utilize any of the existing parallel algorithms for heap traversal, with any kind of load balancing (e.g., work dealing, work stealing), and can benefit from developments in load balancing techniques.

In general, as with all dynamic load balancing schemes, it is always possible to come up with a demonic graph topology (e.g., a singly linked list) that defeats parallelism of our probe algorithms. However, with increasing heap sizes and the increasing variety of structures found in the heap, it is likely that the parallel heap traversal algorithms will perform well in most applications.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 9:
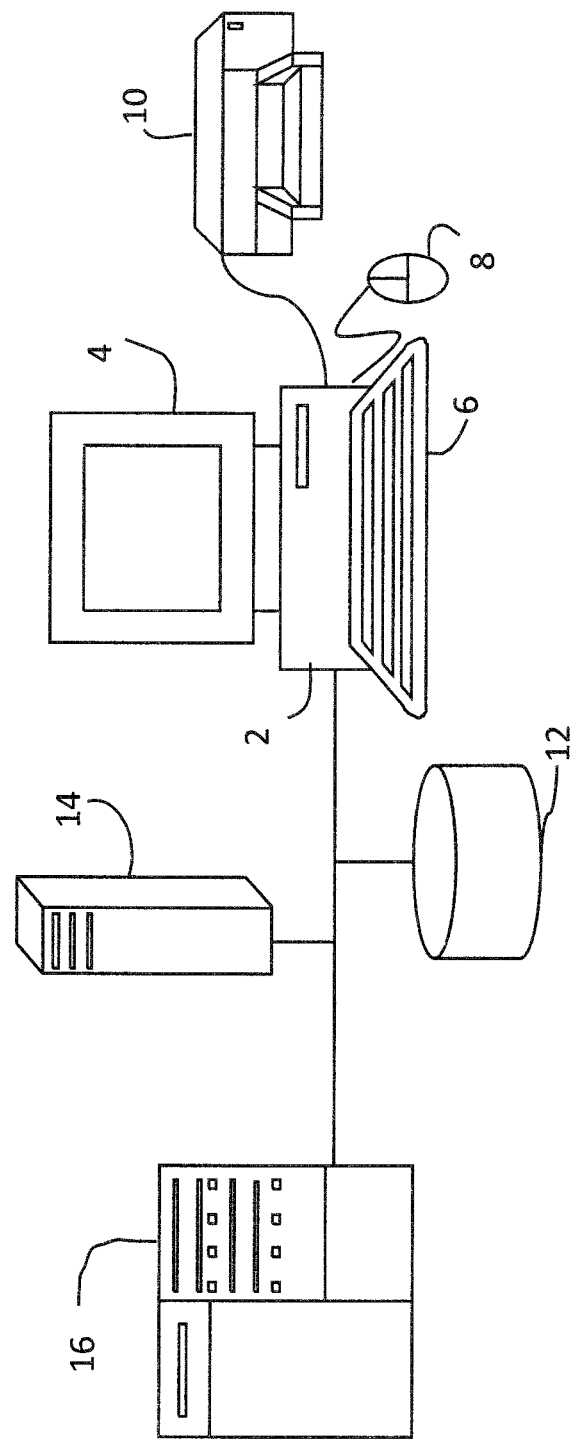
FIG. 9 illustrates an example of a computer system, in which the systems and methodologies of the present disclosure may be carried out or executed.

Referring now to FIG. 9, the systems and methodologies of the present disclosure may be carried out or executed in a computer system that includes a processing unit 2, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 2 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 4 for presenting output displays and providing a display through which the user may input data and interact with the processing system, for instance, in cooperation with input devices such as the keyboard 6 and mouse device 8 or pointing device. The computer processing system may be also connected or coupled to one or more peripheral devices such as the printer 10, scanner (not shown), speaker, and any other devices, directly or via remote connections. The computer processing system may be connected or coupled to one or more other processing systems such as a server 16, other remote computer processing system 14, network storage devices 12, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 2, 14, 16), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for providing programming language support for debugging heap related errors, comprising:
   a memory including an area made available to a program;
   a processor configured to execute one or more queries for determining one or more global properties associated with use of the area by the program,
   wherein the one or more queries comprise at least a query that determines whether an object in the memory is reachable only from a calling application thread by tracing in parallel from all threads except the calling application thread, blocking all threads and releasing one, in response to determining that the object is marked, setting return result to false, in response to determining that the object is not marked, setting return result to true, and releasing all blocked threads, the one or more queries used inside a Java programming language assertion statement that contains an expression that is assumed to be true when the assertion statement executes and if the expression evaluates to not true, an error is thrown by an entity executing the Java programming language assertion statement, wherein the one or more queries inspects a shape of the memory at a point in the program, and wherein the programming language support enables a programmer to directly invoke from the program, the one or more queries that inspects the shape of the memory at a point in the program, and wherein the one or more queries are configured to execute in parallel with synchronization mechanism, wherein the one or more queries further comprises a query that determines whether there is an object reachable from at least two different objects by having multiple evaluator threads trace in parallel from a respective source and each evaluator thread in response to finding the object, adding the respective source to a local set, said each evaluator thread combining respective local set into a global set, blocking all evaluator threads except for one evaluator thread, said one evaluator thread computing result wherein the result is true if the global set has size greater than one, and the result is false if the global set has size less than equal to one.

2. The system of claim 1, wherein the processor is configured to execute the one or more queries in parallel by dynamically utilizing available number of cores.

3. The system of claim 2, wherein the processor is configured to use synchronization primitives in the one or more queries.

4. The system of claim 2, wherein the processor executes a plurality of evaluator threads for performing a query, at least one evaluator thread running on each available core.

5. The system of claim 1, wherein the one or more queries includes at least one of:
   determining whether an object is pointed to by a heap object;
   determining whether an object is pointed to by two or more heap objects;
   determining whether a destination object is reachable from a source object;
   determining whether there is an object reachable from at least two different objects;
   determining whether an object is reachable only from a calling application thread;
   determining whether all paths to a target object go through a source object;
   determining all application thread objects which can reach an object without going through a predetermined set of avoid objects;
   determining whether all paths from the source object to a destination object go through at least one object in a predetermined set of cut objects;
   or combinations thereof.

6. A method for programming language support for debugging heap related errors, comprising:
   executing one or more queries for determining one or more global properties associated with use of an area in memory device by a program,
   wherein the one or more queries comprise at least a query that determines whether an object in the memory is reachable only from a calling application thread by tracing in parallel from all threads except the calling application thread, blocking all threads and releasing one, in response to determining that the object is marked, setting return result to false, in response to determining that the object is not marked, setting return result to true, and releasing all blocked threads, the one or more queries used inside a Java programming language assertion statement that contains an expression that is assumed to be true when the assertion statement executes and if the expression evaluates to not true, an error is thrown by an entity executing the Java programming language assertion statement, wherein the one or more queries inspects a shape of the memory at a point in the program, and wherein the programming language support enables a programmer to directly invoke from the program, the one or more queries that inspects the shape of the memory at a point in the program, and wherein the one or more queries are configured to execute in parallel with synchronization mechanism, wherein the one or more queries further comprises a query that determines whether there is an object reachable from at least two different objects by having multiple evaluator threads trace in parallel from a respective source and each evaluator thread in response to finding the object, adding the respective source to a local set, said each evaluator thread combining respective local set into a global set, blocking all evaluator threads except for one evaluator thread, said one evaluator thread computing result wherein the result is true if the global set has size greater than one, and the result is false if the global set has size less than equal to one.

7. The method of claim 6, wherein at least one of the one or more queries utilizes synchronization primitives to implement parallel execution.

8. The method of claim 7, wherein the one or more queries are executed in parallel by dynamically utilizing available number of cores.

9. The method of claim 7, wherein a plurality of evaluator threads are executed for performing a query, at least one evaluator thread running on each available core.

10. The method of claim 7, wherein the at least one of the queries includes:
   determining whether an object is pointed to by two or more heap objects;
   determining whether a destination object is reachable from a source object;
   determining whether there is an object reachable from at least two different objects; or
   combinations thereof.

11. The method of claim 6, wherein the one or more queries includes at least one of:
   determining whether an object is pointed to by a heap object;
   determining whether an object is pointed to by two or more heap objects;
   determining whether a destination object is reachable from a source object;
   determining whether there is an object reachable from two different objects;
   determining whether an object is reachable only from a calling application thread;
   determining whether all paths to a target object go through a source object;
   determining all application thread objects which can reach an object without going through a predetermined set of avoid objects;

determining whether all paths from the source object to the destination object go through at least one object in a predetermined set of cut objects;

or combinations thereof.

12. A computer readable storage medium, excluding signal per se, storing a program of instructions executable by a machine to perform a method of programming language support for debugging heap related errors, comprising:

executing one or more queries for determining one or more global properties associated with use of an area in memory device by a program, wherein the one or more queries comprise at least a query that determines whether an object in the memory is reachable only from a calling application thread by tracing in parallel from all threads except the calling application thread, blocking all threads and releasing one, in response to determining that the object is marked, setting return result to false, in response to determining that the object is not marked, setting return result to true, and releasing all blocked threads, the one or more queries used inside a Java programming language assertion statement that contains an expression that is assumed to be true when the assertion statement executes and if the expression evaluates to not true, an error is thrown by an entity executing the Java programming language assertion statement, wherein the one or more queries inspects a shape of the memory at a point in the program, and wherein the programming language support enables a programmer to directly invoke from the program, the one or more queries that inspects the shape of the memory at a point in the program, and wherein the one or more queries are configured to execute in parallel with synchronization mechanism, wherein the one or more queries further comprises a query that determines whether there is an object reachable from at least two different objects by having multiple evaluator threads trace in parallel from a respective source and each evaluator thread in response to finding the object, adding the respective source to a local set, said each evaluator thread combining respective local set into a global set, blocking all evaluator threads except for one evaluator thread, said one evaluator thread computing result wherein the result is true if the global set has size greater than one, and the result is false if the global set has size less than equal to one.

13. The computer readable storage medium of claim 12, wherein at least one of the one or more queries utilizes synchronization primitives to implement parallel execution of the at least one of the one or more queries.

14. The computer readable storage medium of claim 13, wherein the one or more queries are executed in parallel by dynamically utilizing available number of cores.

15. The computer readable storage medium of claim 13, wherein a plurality of evaluator threads are executed for performing a query, at least one evaluator thread running on each available core.

16. The computer readable storage medium of claim 13, wherein the at least one of the queries includes:

determining whether an object is pointed to by two or more heap objects;

determining whether a destination object is reachable from a source object;

determining whether there is an object reachable from two different objects; or combinations thereof.

17. The computer readable storage medium of claim 12, wherein the one or more queries includes at least one of:

determining whether an object is pointed to by a heap object;

determining whether an object is pointed to by two or more heap objects;

determining whether a destination object is reachable from a source object;

determining whether there is an object reachable from at least two different objects;

determining whether an object is reachable only from a calling application thread;

determining whether all paths to a target object go through a source object;

determining all application thread objects which can reach an object without going through a predetermined set of avoid objects;

determining whether all paths from the source object to the destination object go through at least one object in a predetermined set of cut objects;

or combinations thereof.

* * * * *